United States Patent Office 3,453,305
Patented July 1, 1969

---

3,453,305
PROCESS FOR PREPARING SILOXANES
Terry G. Selin, Schenectady, N.Y., assignor to General Electric Company, a corporation of New York
No Drawing. Filed Dec. 19, 1966, Ser. No. 602,562
Int. Cl. C07f 7/18, 7/02, 7/08
U.S. Cl. 260—448.2
9 Claims

ABSTRACT OF THE DISCLOSURE

Siloxanes of known utility are prepared by the following three reactions:

(1) $2\equiv\!SiOM + YOY \longrightarrow \equiv\!SiOSi\equiv + 2MOY$ (2) $2\equiv\!SiOM + YX \longrightarrow \equiv\!SiOSi\equiv + MOY + MX$ (3) 
$$2\equiv\!SiOM + Cl\overset{O}{\underset{\|}{S}}Cl \longrightarrow SiOSi\equiv + 2MCl + SO_2$$

Where M is Li, Na, or K, Y is an acyl radical, and X is a halogen.

---

This invention relates to a process for forming siloxanes and, more specifically, deals with the preparation of new siloxanes by reacting certain metal-containing organosilicon compounds with acid anhydrides or acid halides.

Processes have been available for sometime for the preparation of linear and cyclic siloxanes. However, such processes have not been readily adaptable for the preparation of siloxanes having particular chain lengths or configurations.

It is an object of the present invention to provide an improved process for formula siloxanes.

It is a further object of the present invention to provide an improved process for forming siloxanes of particular chain lengths or configuration.

Additional objects of the invention will be apparent from the following description.

In accordance with the present invention, there is provided a process for forming siloxanes comprising reacting an anhydride or halide of an organic carboxylic acid or a halide of an oxygenated inorganic acid with an organosilicon compound containing at least one silicon-bonded —OM radical, where M is selected from the class consisting of lithium, sodium, or potassium, whereby a silicon atom attached to one —OM radical is joined to a silicon atom attached to another —OM radical through a new siloxane linkage.

The reaction involved in the present invention is best illustrated by the following Equations 1, 2, and 3, which show the reaction with an anhydride, a halide of an organic carboxylic acid, and a halide of an oxygenated inorganic acid.

(1) $\equiv\!SiOM + YOY + MOSi\equiv \longrightarrow \equiv\!SiOSi\equiv + 2MOY$ (2) $\equiv\!SiOM + YX + MOSi\equiv \longrightarrow \equiv\!SiOSi\equiv + MOY + MX$ (3) 
$$\equiv\!SiOM + Cl\overset{O}{\underset{\|}{S}}Cl + NOSi\equiv \longrightarrow \equiv\!SiOSi\equiv + 2MCl + SO_2$$

In the above formulas, Y represents an acyl radical, X represents halogen and M is as previously defined. In Equation 1, it is shown that a first silicon atom containing an —OM radical reacts with a second silicon atom having an —OM radical and with an acid anhydride to produce a new siloxane linkage and the metal salt of the acid. In Equation 2, there is shown the same reaction with an acid halide of an organic carboxylic acid, in which case the products are the siloxane, the salt of the acid, and the metal halide. In Equation 3 is shown an illustrative reaction with a halide of an oxygenated inorganic acid, such as sulfuryl chloride, which shows that the product of the reaction includes the siloxane, a metal halide, and sulfur dioxide.

The organosilicon compounds containing silicon-bonded —OM groups which are employed in the practice of the present invention include silanolates, siloxanolates, disilanolates, and disodium trisiloxanediolate-p-dioxane complexes. The silanolates employed in the practice of the present invention have the formula:

(4) $(MO)_n(R)_{4-n}Si$ where M is as previously defined, R is a monovalent hydrocarbon radical, and $n$ is an integer equal to from 1 to 2, inclusive.

The siloxanolates employed in the practice of the present invention have the formula:

(5) $(MO)_a(R)_bSiO_{\frac{4-a-b}{2}}$ where M and R are as previously defined, $a$ has a value of from 0.005 to 1, inclusive, $b$ has a value of from 2.000 to 2.5, inclusive, and the sum of $a$ plus $b$ is equal to from 2.01 to 3, inclusive.

The disilanolates employed in the practice of the present invention have the formula:

(6) $(MO)_cR_{3-c}SiSi(R)_{3-d}(OM)_d$ where M and R are as previously defined, $c$ and $d$ are both whole numbers equal to from 0 to 1, inclusive, and the sum of $c$ plus $d$ is an integer equal to from 1 to 2, inclusive.

The disodium trisiloxanediolate-p-dioxane complexes employed in the practice of the present invention have the formula:

(7) 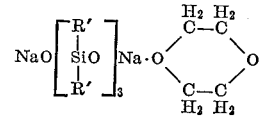

where R' is an aryl radical.

Illustrative of the monovalent hydrocarbon radicals represented by R in Formulas 4, 5, and 6 are, for example, alkyl radicals, e.g., methyl, ethyl, propyl, butyl, octyl, octadecyl, etc. radicals; aryl radicals, e.g., phenyl, naphthyl, tolyl, xylyl, etc. radicals; aralkyl radicals, e.g., benzyl, phenylethyl, etc. radicals; alkenyl radicals, e.g., vinyl, allyl, etc. radicals; cycloaliphatic hydrocarbon radicals, e.g., cyclohexyl, cycloheptyl, cyclohexenyl, etc. radicals. Also included within the scope of the monovalent hydrocarbon radicals are substituted monovalent hydrocarbon radicals in which the substituents are inert under the conditions of the reaction of the present invention, including, for example, halogenated monovalent aryl radicals and cyanoalkyl radicals. Included are monovalent hydrocarbon radicals, such as chlorophenyl, dibromophenyl, trifluorophenyl, etc. radicals. The cyanoalkyl radicals include beta-cyanoethyl, gamma-cyanopropyl, etc. radicals. Other substituted radicals include p-nitrophenyl, p-cyanophenyl, etc. radicals. Preferably, the radicals represented by R are methyl and phenyl, with the preferred specific radicals being the methyl radical.

Included among the aryl radicals represented by the two R' groups of Formula 7 are both unsubstituted aryl radicals and aryl radicals which contain substituents which are generally inert under the reaction conditions involved in the present invention. Typical unsubstituted aryl radicals include, for example, phenyl, naphthyl, and biphenyl radicals. Typical substituted aryl radicals include tolyl, xylyl, ethylphenyl, phenoxyphenyl, p-chlorophenyl, o-bromophenyl, p-cyanophenyl, p-nitrophenyl, trifluoromethylphenyl, and m-trimethylsilylphenyl radicals. In the preferred embodiment of my invention, all of the R' groups in the p-dioxane complex are phenyl radicals.

From the description of the silanolates within the scope of Formula 4, it is seen that these silanolates can contain one or two silicon-bonded —OM radicals per silicon atom. Typical of such silanolates are, for example, sodium trimethylsilanolate, potassium trimethylsilanolate, lithium trimethylsilanolate, sodium triphenylsilanolate, lithium triethylsilanolate, dilithium diphenylsilanediolate, disodium dimethylsilanediolate, etc.

The siloxanolates within the scope of Formula 5 include a great many materials which vary from disiloxanes through polysiloxanes containing up to about 200 silicon atoms per molecule. These siloxanolates include both linear and branched chain materials which can contain various types of siloxane units, including diorganosiloxane units, triorganosiloxane units, and monoorganosiloxane units, as well as siloxane units which contain one or more —OM radicals, so long as the proportions of the various types of siloxane units are selected so as to be within the scope of Formula 5. A particularly useful class of starting siloxanolates are the disiloxanolates in which one or both of the silicon atoms contain a silicon-bonded —OM radical. Typical disiloxanolates of this type include sodium-1,1,1-trimethyl-3,3-diphenyldisiloxane-3-olate; lithium-1,1,1,3-tetramethyl-3-beta-cyanoethyldisiloxane-3-olate; potassium-1,1,3-tetramethyl-3-vinyldisiloxane-3-olate; dilithium-1,1,3,3-tetramethyldisiloxane-1,3-diolate, etc. Typical trisiloxane diolates within the scope of the present invention include, for example, lithium heptamethyltrisiloxane-1-olate; disodium hexamethyltrisiloxane-1,5-diolate, etc.

The disilanolates employed in the present invention include materials such as lithium pentamethyldisilanolate; disodium-1,1,2,2-tetramethyldisilane-1,2-diolate; dipotassium-1,1,2,2-tetraphenyldisilane-1,2-diolate, etc.

Many of the organosilicon compounds containing silicon-bonded —OM radicals which are employed in the practice of the present invention are known in the art and many others are described in my copending applications Ser. No. 602,478, Ser. No. 602,532, Ser. No. 602,490, Ser. No. 602,541, and Ser. No. 602,519, all of the aforementioned applications being filed concurrently herewith and assigned to the same assignee as the present invention. The disodium trisiloxanediolate-p-dioxane complexes are described in the aforementioned Ser. No. 602,490.

The organic carboxylic acids whose anhydrides and halides are employed in the practice of the present invention include substantially all known carboxylic acids, whether the acids are aromatic or aliphatic, saturated or unsaturated, monobasic or polybasic. The monobasic aliphatic carboxylic acids include acetic, propionic, n-butyric, m-caproic, isobutylacetic, lauric, etc. acids. Unsaturated aliphatic monocarboxylic acids include acids such as crotonic acid, angelic acid, tiglic acid, acrylic acid, undecylenic acid, oleic acid, eurcic acid, linoleic acid, linolenic acid, etc. Polybasic acids include such common aliphatic dicarboxylic acids as malonic acid, succinic acid, glutaric acid, adipic acid, pimelic acid, suberic acid, azelaic acid, sebacic acid, tricarballylic acid, etc. Illustrative of the unsaturated polybasic acids are fumaric acid, maleic acid, mesaconic acid, citraconic acid, glutaconic acid, aconitic acid, etc. Aromatic acids include benzoic acid, tropic acid, cinnamic acid, phthalic acid, isophthalic acid, terephthalic acid, etc. While the foregoing grouping lists the acids, it is understood that it is not the acids which are employed in the present invention, but it is the anhydrides of such acids and the halides (fluorides, chlorides, bromides or iodides) of such acids. The preferred acid for use in the practice of the present invention is acetic acid, with the preferred materials in the anhydride and halide class being acetic anhydride and acetyl chloride. The inorganic acid halides which can be employed in the practice of the present invention are the halides of oxygenated acids and include such acid halides as sulfuryl chloride, thionyl chloride, nitryl chloride, nitrosyl chloride, phosphorous oxychloride, and phosgene.

As shown by Formulas 1, 2, and 3, the reaction of the present invention involves a silicon-bonded —OM group attached to one silicon atom and a silicon-bonded —OM group attached to another silicon atom, and the acid derivative. The particular product formed by the process of the present invention is a function of the particular starting material employed. Where the organosilicon compound contains only one silicon-bonded —OM group per molecule, the result of the reaction of the present invention is to couple two of the molecules together by the formation of a siloxane linkage. For example, when the starting material is sodium trimethylsilanolate, the product produced by the process of the present invention is hexamethyldisiloxane. When the starting material is lithium pentamethyldisiloxanolate, the resulting product is decamethyltetrasiloxane.

On the other hand, when the starting organosilicon compounds contain more than one silicon-bonded —OM group, the possibility exists of the formation of a siloxane linkage between the two silicon atoms of the same molecule or the formation of a siloxane linkage between silicon atoms of different molecules. In the former case, it is apparent that cyclic products will be formed. For example, when the starting material is the dilithium hexamethyltrisiloxane-1,5-diolate, the product will tend to be either hexamethylcyclotrisiloxane or a linear polydimethylsiloxane, depending upon the reaction conditions. Likewise, with the disodium trisiloxanediolate-p-dioxane complexes of my aforementioned copending application Ser. No. 602,490, the product of the reaction is almost always the hexaarylcyclotrisiloxane. With starting materials such as disodium diphenylsilanediolate, the product of the reaction is generally a mixture of linear and cyclic diphenylpolysiloxanes.

Since the organosilicon compounds containing silicon-bonded —OM radicals employed in the practice of the present invention are solid materials, the reaction is generally conducted in the presence of a solvent. Any solvent which will dissolve the reactants and which is inert to the reactants under the conditions of the reaction is satisfactory. The preferred solvents are hydrocarbons, such as hexane, octane, benzene, toluene, xylene. Other suitable solvents included oxygenated solvents, such as ethers, like diethyl ether and tetrahydrofuran; amines, such as pyridine; amides, such as dimethylformamide; and nitriles, such as acetonitrile and benzonitrile.

The stoichiometry of the reaction of the present invention is apparent from Equations 1, 2, and 3, which show that 2 moles of —OM radicals in the organosilicon compounds containing silicon-bonded —OM groups are employed for each mole of anhydride or acid chloride groups in the anhydride or halide component. Thus, with a monobasic acid, such as acetic acid, one mole of acetic anhydride or acetyl halide is employed for each two moles of silicon-bonded —OM radicals in the starting material. With a polybasic acid anhydride or halide, the proportions of reactants are adjusted accordingly. For example, only one mole of the dichloride of malonic acid is employed for each four moles of silicon-bonded OM radicals in the starting material.

Since the purpose of the reaction of the present invention is to prepare new siloxane linkages, it is preferred to conduct the reaction in a manner which insures reaction of all silicon-bonded —OM radicals. While the stoichiometry of the reaction has been described above, and while the reaction is essentially quantitative when stoichiometric amounts of the two reactants are employed, it is often desirable to conduct the reaction with an excess, such as a two or three-fold excess of the acid anhydride or halide so as to insure that all silicon-bonded —OM groups are reacted.

In carrying out the reaction of the present invention, the organosilicon compound of Formula 4, 5, 6, or 7 is dissolved in the solvent mentioned above. Generally, the solvent is employed in an amount equal to from about 1 to 100 parts solvent per part by weight of the other components of the reaction mixture. Generally, the amount of solvent employed is selected for convenient handling of the reaction mixture and has no effect on the direction of the reaction. However, in certain cases, the amount of solvent has a significant effect on the course of reaction simply because of dilution effects. When the organosilicon compound reactant has more than one silicon-bonded —OM radical per molecule and thus can theoretically have a reaction involving either two silicon atoms in the same molecule or two silicon atoms in different molecules, the tendency is for an intramolecular reaction with more dilute solutions and an intermolecular reaction in more concentrated solutions. Thus, disodium hexamethyltrisiloxane-1,7-diolate will tend to form hexamethylcyclotrisiloxane in dilute solutions and linear polydimethylsiloxanes in more concentrated solutions.

After a solution of the organosilicon compound is formed, the acid anhydride or acid halide is slowly added to the reaction mixture. The reaction is exothermic in nature, and the rate of addition of the acid anhydride or acid halide will generally control the temperature of the reaction. In general, the rate of addition is controlled so as to maintain the reaction mixture at a temperature of from about 25 to 75° C. The time required for the addition is obviously a function of the amount of reactant employed. Where an excess of the acid anhydride or halide is employed, it will be noted that as soon as the stoichiometric amount of anhydride or halide is added, the reaction begins to cool to room temperature even though additional anhydride or halide is being added. At the completion of the reaction, the reaction mixture consists of a solution of the formed polysiloxane in the solvent and with a precipitate of the metal halide and/or metal salt, together with unreacted acid anhydride or halide which might or might not be soluble in the solvent. Any precipitate is filtered from the reaction mixture and the desired product is separated from the filtrate by fractional distillation.

The invention is illustrated, rather than limited, by the following examples. All parts are by weight unless indicated otherwise.

Example 1

Sodium trimethylsilanolate was reacted with acetic anhydride to form hexamethyldisiloxane, as indicated:

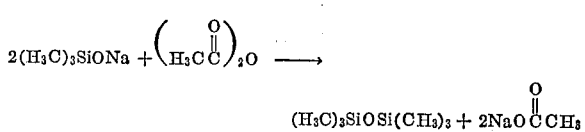

A one liter, 3-necked flask was equipped with a stirrer, thermometer, condenser, and addition funnel. To this flask were charged 48.5 g. (0.43 mole) of sublimed sodium trimethylsilanolate and 350 ml. of dry hexane. With stirring, the resulting solution was treated with 45.9 g. (0.45 mole—100% excess) of acetic anhydride in a dropwise manner over approximately one hour. During the first half of the addition, the reaction was very exothermic, the temperature ranging from 25° C. to 60° C. The large quantity of sodium acetate which had formed during the anhydride addition was removed upon filtering the mixture. The clear, colorless filtrate was then fractionally distilled at slightly reduced pressure yielding only hexane and hexamethyldisiloxane, with practically no distillation residue. The two products were characterized by comparing gas chromatographic retention times with authentic samples.

Example 2

Octaphenylcyclotetrasiloxane was formed by reacting disodium octaphenyltetrasiloxane-1,7-diolate with acetyl chloride, viz.:

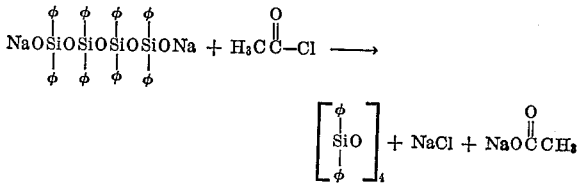

wherein φ is phenyl.

A flask equipped with magnetic stirrer, drying tube, and addition funnel was charged with 10.6 g. (0.0124 mole) of Na(OSiφ₂)₄ONa, and 100 ml. of dry benzene. With stirring, 3 g. (0.038 mole—200% excess) of freshly distilled acetyl chloride in 30 ml. of dry benzene were added dropwise over a one hour period of time to the dioltte, during which time the temperature of the reaction mixture rose slightly. A fine white solid (a mixture of sodium chloride and sodium acetate) precipitated during the addition. After the reaction was complete, the reaction mixture was washed with NaHCO₃ solution, and then with water. The resulting benzene solution was flash evaporated, yielding 8.4 g. of a white crystalline product. The infrared spectrum of this product was identical to that obtained from a reference sample of octaphenylcyclotetrasiloxane. Recrystallization of the product from toluene led to the formation of needle-like crystals melting at 195–196° C. Thus, the product was characterized as octaphenylcyclotetrasiloxane and was obtained in 86% yield.

Example 3

Hexaphenylcyclotrisiloxane was formed by reacting acetic anhydride with a complex of p-dioxane and disodium hexaphenyltrisiloxane-1,5-diolate:

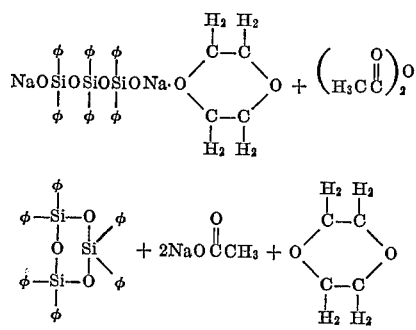

Under a moisture free atmosphere, 10 g. (0.0134 mole) of disodium hexaphenyltrisiloxane-1,5-diolate - dioxane complex were combined with 50 ml. of dry benzene in a small flask. With stirring, a solution of 1.8 g. (0.0176 mole) of acetic anhydride in 20 ml. of benzene was added dropwise to the diolate complex over a period of 80 minutes. The reaction was slightly exothermic, temperature 35° C., and following the addition the mixture was stirred for an additional one hour. After washing the reaction mixture with 1% sodium carbonate solution, the clear benzene solution was dried briefly over Na₂SO₄ and then flash evaporated to remove all volatiles. The resulting semicrystalline mass was taken up in approximately 15 ml. of acetone which left well formed plate-like crystals. These crystals were isolated, washed, and dried, yielding 2.5 g. (31%) of hexaphenylcyclotrisiloxane melting at 189–191° C.

Example 4

A tetrasiloxane in which the two terminal silicon atoms contained 3 dimethyl groups and in which the 2 middle silicon atoms contained 2 diphenyl groups is formed by reacting lithium-1,1,1-trimethyl-3,3-diphenyldisiloxane-3- olate with sulfuryl chloride in the presence of tetrahydrofuran according to the following reaction

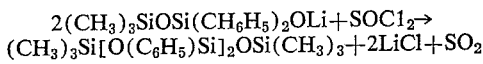

Under a blanket of dry nitrogen in a reaction vessel, 50 g. (0.17 mole) of lithium-1,1,1-trimethyl-3,3-diphenyldisiloxane-3-olate is added to 500 g. of tetrahydrofuran. While the reaction mixture is stirred, a solution of 11.9 g. (0.10 mole) of sulfuryl chloride in 100 g. tetrahydrofuran is slowly added over a one hour period. During this time, the reaction mixture temperature rises about 10° C. During the initial portion of the addition, sulfur dioxide is evolved from the reaction mixture and a lithium chloride precipitate is formed. This lithium chloride precipitate is filtered, the filtrate is washed with aqueous sodium bicarbonate, the resulting tetrahydrofuran solution is dried over sodium sulfate and then flash evaporated to remove volatiles. This results in the isolation of 1,1,1,7,7,7-hexamethyl-3,3,5,5-tetraphenyltetrasiloxane.

While the foregoing examples have illustrated a number of the embodiments of my invention, it should be understood that my invention relates broadly to the preparation of siloxanes by the reaction of (A) an organosilicon compound which is either a silanolate, a siloxanolate, a disilanolate, or a particular dioxane complex with (B) an anhydride or halide of an organic carboxylic acid or with a halide of an oxygenated inorganic acid. The products formed by the present invention have the same utility as products formed by other silicon techniques. For example, these products can be used as heat transfer fluids, as dielectric fluids, as lubricants, as additives to lubricants, as antifoam agents, and in all other environments in which organopolysiloxanes are commonly employed.

What I claim as new and desire to secure by Letters Patent of the United States is:

1. The process for forming an organopolysiloxane which comprises adding an acidic material selected from the class consisting of anhydrides of organic carboxylic acids, halides of organic carboxylic acids, and halides of oxygenated inorganic acids to an organic solvent solution of an organosilicon compound containing a silicon-bonded —OM radical and selected from the class consisting of organosilanolates having the formula:

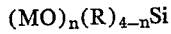

organosiloxanolates having the formula,

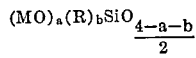

organodisilanolates having the formula,

and siloxanolate-dioxane complexes having the formula,

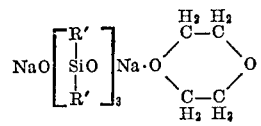

where M is a member selected from the class consisting of lithium, sodium, and potassium; R is a monovalent hydrocarbon radical; R' is an aryl radical; $n$ is an integer equal to from 1 to 2, inclusive; $a$ has a value of from 0.005 to 1, inclusive; $b$ has a value of from 2.000 to 2.5, inclusive; the sum of $a$ plus $b$ is equal to from 2.01 to 3, inclusive; $c$ and $d$ are both whole numbers equal to from 0 to 1, inclusive; and the sum of $c$ plus $d$ is an integer equal to from 1 to 2, inclusive.

2. The process of claim 1 in which said acidic material is acetic anhydride.

3. The process of claim 1 in which said acidic material is acetyl chloride.

4. The process of claim 1 in which said organosilicon compound is an organosilanolate having the formula,

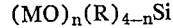

where M is a member selected from the class consisting of lithium, sodium, and potassium, R is a monovalent hydrocarbon radical and $n$ is an integer equal to from 1 to 2, inclusive.

5. The process of claim 1 in which said organosilicon compound is an organosiloxanolate having the formula:

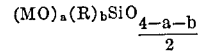

where M is a member selected from the class consisting of lithium, sodium, and potassium; R is a monovalent hydrocarbon radical; $a$ has a value of from 0.005 to 1, inclusive; $b$ has a value of from 2.000 to 2.5, inclusive; and the sum of $a$ plus $b$ is equal to from 2.01 to 3, inclusive.

6. The process of claim 1 in which said organosilicon compound is a silanolate-dioxane complex having the formula:

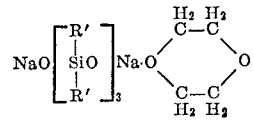

where R' is an aryl radical.

7. The process of claim 4 in which said acidic compound is a member selected from the class consisting of acetic anhydride and acetyl chloride.

8. The process of claim 5 in which said acidic compound is a member selected from the class consisting of acetic anhydride and acetyl chloride.

9. The process of claim 6 in which said acidic compound is acetic anhydride.

References Cited

UNITED STATES PATENTS 3,337,497   8/1967   Bostick _____ 260—448.2 X

TOBIAS E. LEVOW, *Primary Examiner.*

P. F. SHAVER, *Assistant Examiner.*

U.S. Cl. X.R.

260—46.5, 398